(12) United States Patent
Ahmed et al.

(10) Patent No.: US 6,174,348 B1
(45) Date of Patent: Jan. 16, 2001

(54) NITROGEN SYSTEM FOR REGENERATING CHEMICAL SOLVENT

(75) Inventors: M. Mushtaq Ahmed, Pittsford; Minish Mahendra Shah, East Amherst; Raymond Francis Drnevich, Clarence Center, all of NY (US)

(73) Assignee: Praxair Technology, Inc., Danbury, CT (US)

(*) Notice: Under 35 U.S.C. 154(b), the term of this patent shall be extended for 0 days.

(21) Appl. No.: 09/375,482

(22) Filed: Aug. 17, 1999

(51) Int. Cl.[7] ................................................. B01D 53/14
(52) U.S. Cl. .................. 95/160; 95/161; 95/163; 95/165; 95/169; 95/236; 96/234; 96/242
(58) Field of Search ............... 96/242, 234; 95/159, 95/160, 161, 163, 165, 169, 170, 171, 183, 236, 191

(56) References Cited

U.S. PATENT DOCUMENTS

| | | | |
|---|---|---|---|
| 3,252,269 | * 5/1966 | Woertz | 95/163 |
| 3,594,985 | * 7/1971 | Ameen | 95/163 |
| 3,824,766 | * 7/1974 | Valentine et al. | 95/163 |
| 3,880,615 | * 4/1975 | Grunewald et al. | 95/161 |
| 3,932,582 | 1/1976 | Eickmeyer | 423/223 |
| 3,975,172 | * 8/1976 | Ranke | 95/161 |
| 4,050,909 | * 9/1977 | Ranke | 95/161 |
| 4,271,132 | 6/1981 | Eickmeyer | 423/223 |
| 4,409,191 | 10/1983 | Osman | 423/220 |
| 4,430,312 | 2/1984 | Eickmeyer | 423/223 |
| 4,551,158 | * 11/1985 | Wagner et al. | 95/236 |
| 4,609,389 | * 9/1986 | Karwat | 95/236 |
| 4,702,898 | 10/1987 | Grover | 423/220 |
| 4,957,515 | 9/1990 | Hegarty | 55/43 |
| 5,066,314 | * 11/1991 | Leites et al. | 95/163 |
| 5,085,675 | * 2/1992 | Kriebel et al. | 95/183 |
| 5,145,658 | 9/1992 | Chao | 423/232 |
| 5,240,476 | 8/1993 | Hegarty | 97/161 |
| 5,435,977 | 7/1995 | Chao | 422/171 |

* cited by examiner

Primary Examiner—Duane S. Smith
(74) Attorney, Agent, or Firm—Stanley Ktorides

(57) ABSTRACT

A system for regenerating chemical solvent loaded with acid gas with improved energy efficiency wherein the chemical solvent is partially flash vaporized, heated, and passed in countercurrent mass transfer contact with nitrogen gas.

10 Claims, 3 Drawing Sheets

US 6,174,348 B1

NITROGEN SYSTEM FOR REGENERATING CHEMICAL SOLVENT

TECHNICAL FIELD

This invention relates generally to the use of chemical solvent for the removal of acid gas from a process stream, and the subsequent regeneration of the chemical solvent so that it could be reused for further acid gas removal.

BACKGROUND ART

Many chemical production processes utilize regenerable chemical solvents to remove acid gases from product streams or other process streams. Typically such chemical solvents are regenerated for reuse utilizing steam as a stripping agent and as a source of heat for the endothermic chemical reactions. Such regeneration systems, while effective, are energy intensive.

Accordingly it is an object of this invention to provide a system for regenerating chemical solvents, which have been used to remove acid gas from a process stream, which is more energy efficient than conventionally employed systems for such regeneration.

SUMMARY OF THE INVENTION

The above and other objects, which will become apparent to one skilled in the art upon a reading of this disclosure, are attained by the present invention, one aspect of which is:

A method for regenerating a chemical solvent comprising:

(A) contacting feed gas comprising acid gas with chemical solvent, and passing acid gas from the feed gas into the chemical solvent to produce loaded chemical solvent;

(B) flash vaporizing some of the acid gas from the loaded chemical solvent to produce partially loaded chemical solvent, and heating the partially loaded chemical solvent to produce heated partially loaded chemical solvent;

(C) passing the heated partially loaded chemical solvent in countercurrent mass transfer contact with nitrogen gas and stripping acid gas from the heated partially loaded chemical solvent into the nitrogen gas to produce acidified stripping gas and regenerated chemical solvent;

(D) passing acidified stripping gas in contact with the partially loaded chemical solvent; and (E) recovering regenerated chemical solvent.

Another aspect of the invention is:

Apparatus for regenerating a chemical solvent comprising:

(A) an absorption column, means for passing feed gas comprising acid gas into the lower portion of the absorption column, and means for passing chemical solvent into the upper portion of the absorption column;

(B) a regeneration column, means for passing fluid from the lower portion of the absorption column to the upper portion of the regeneration column, and means for providing heat to the regeneration column;

(C) a stripping column, means for passing fluid from the lower portion of the regeneration column into the stripping column, and means for providing nitrogen gas into the stripping column;

(D) means for passing fluid from the upper portion of the stripping column into the regeneration column; and (E) means for recovering regenerated chemical solvent from the lower portion of the stripping column.

As used herein the term "column" means a contacting column or zone wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing.

As used herein the term "absorption column" means a column wherein suitable chemical solvent selectively absorbs acid gas from a gas mixture.

As used herein the term "stripping column" means a column wherein mass exchange between liquid and gas phases dominates relative to chemical reactions, and results in selective mass transfer of a more volatile component of a downflowing liquid mixture into an upflowing vapor.

As used herein the term "regeneration column" means a column wherein simultaneous liquid phase reactions and mass exchange between liquid and gas phases result in the regeneration of acid gas loaded chemical solvent.

As used herein the term "nitrogen gas" means a fluid comprising at least 95 mole percent nitrogen on a dry basis.

As used herein the terms "upper portion" and "lower portion" mean those sections of a column respectively above and below the mid point of the column.

As used herein the term "indirect heat exchange" means the bringing of two fluids into heat exchange relation without any physical contact or intermixing of the fluids with each other.

As used herein the term "reboiler" means a device which generates column upflow vapor from column liquid.

As used herein the term "acid gas" means a gas that dissolves in water producing an acidic solution.

As used herein the term "chemical solvent" means a solvent that selectively removes acid from a gaseous mixture by adsorption with reaction with a chemical base present in the solvent.

DETAILED DESCRIPTION

In general the invention comprises an arrangement whereby nitrogen gas can be used effectively to separate acid gas from chemical solvent to produce clean chemical solvent. By employing nitrogen gas in this manner, energy intensive steps, such as steam stripping and heating of the acid gas loaded solvent, can be reduced or eliminated.

Figure 1:
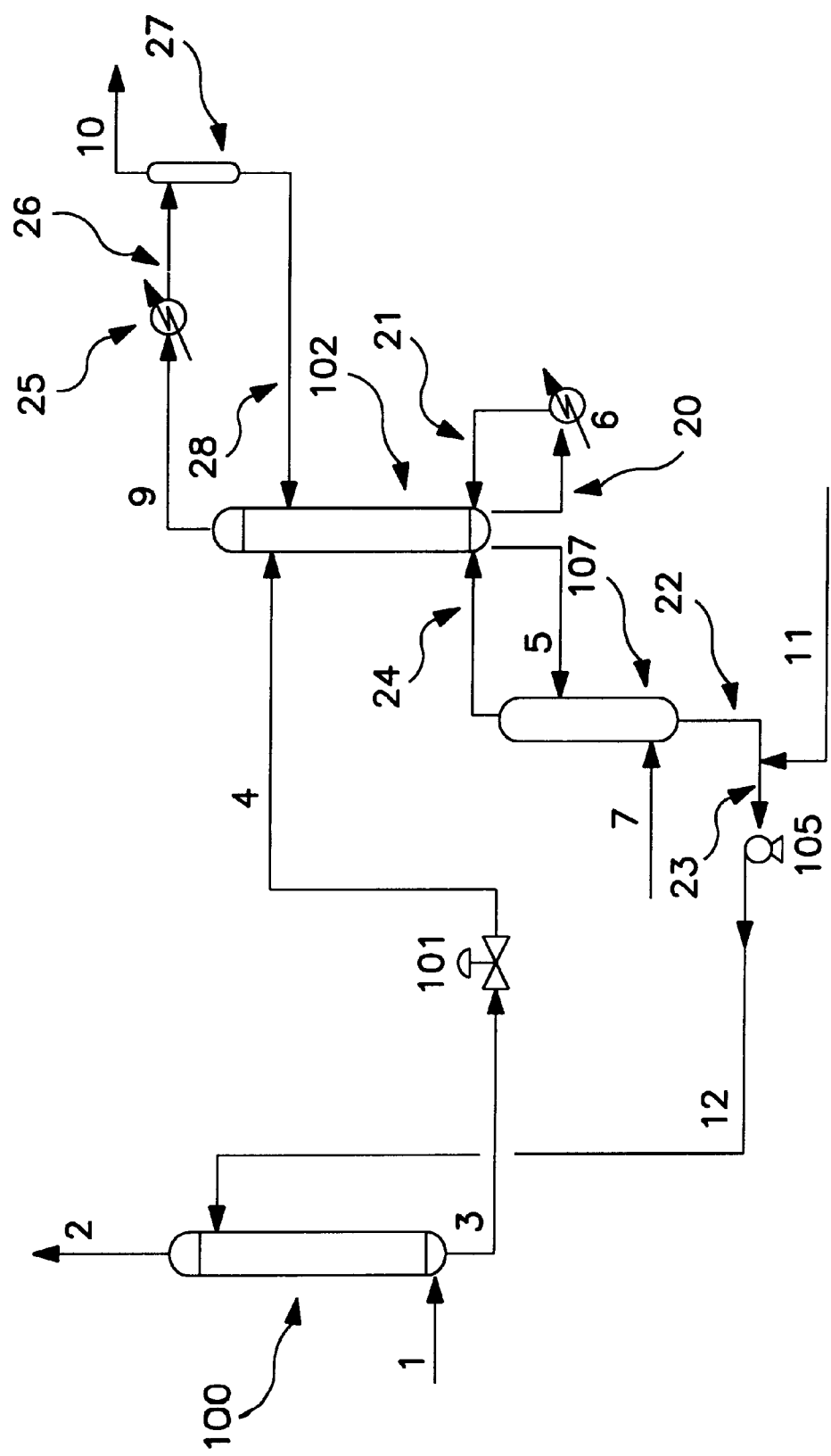
FIG. 1 is a schematic representation of one preferred embodiment of the chemical solvent regeneration system of this invention.

The invention will be described in greater detail with reference to the Drawings. Referring now to FIG. 1, feed gas comprising acid gas is passed in stream 1 into the lower portion of absorption column 100. Typically this feed gas will be at a pressure within the range of from 50 to 1500 psia and at a temperature of from ambient, e.g. 70° F., to about 260° F. Typically the acid gas will comprise from about 1 to 30 mole percent of the composition of the gas in stream 1 passed into column 100.

In the ethylene oxide and vinyl acetate monomer manufacturing processes the feed gas contains acid gas with mixtures of ethylene, ethane, methane, oxygen, nitrogen, argon and water vapor. Acid gas is carbon dioxide. In petroleum refining processes the feed gas contains acid gas with mixtures of hydrocarbons, hydrogen, nitrogen and water vapor. Acid gas is hydrogen sulfide or carbon dioxide or mixtures thereof. In natural gas treating processes the feed gas contains acid gas with mixtures of hydrocarbons, nitrogen and water vapor. Acid gas is hydrogen sulfide or carbon dioxide or mixtures thereof. The feed gas from gasification of coal, oil, petroleum coke and gaseous fuels contains acid gas, with mixtures of hydrogen, carbon monoxide, nitrogen, argon, and water vapor. The acid gas is carbon dioxide or hydrogen sulfide or mixtures thereof.

With reference to FIG. 1 this feed gas is treated with a chemical solvent passed into the upper portion of absorption column 100 in stream 12. Among the chemical solvents which may be used in the practice of this invention one can name alkali salt solutions such as sodium carbonate solution and potassium carbonate solution, ethanolamines such as monoethanol amine (MEA), diethanol amine (DEA), methyldiethanol amine (MDEA) and the like. The chemical solvents could also contain other chemicals: (a) functioning as catalysts to promote the rate of absorption, (b) functioning as inhibitors to prevent chemical solvent degradation, (c) functioning as corrosion inhibitors. The optimal choice of chemical solvent depends on the feed gas composition, feed gas pressure, and specifications on the acid gas concentration in the treated gas.

For illustrative purposes the invention will be described with reference to FIG. 1 in conjunction with the embodiment wherein gas in stream 1 comprises ethylene, ethane, methane, oxygen, nitrogen and water vapor, and the acid gas is carbon dioxide, at a pressure generally within the range of from 50 to 500 pounds per square inch absolute (psia) and at a temperature generally within the range of from ambient temperature to 240° F.

Chemical solvent is passed into the upper portion of absorption column 100 in stream 12. In the specific embodiment discussed in conjunction with FIG. 1, the chemical solvent in stream 12 is potassium carbonate in solution, generally from 15 to 40 weight percent, more typically from 20 to 30 weight percent, and at an elevated temperature, generally within the range of from 80° F. to 260° F., preferably from 100° F. to 200° F.

Gas from stream 1 flows upwardly through column 100 in countercurrent mass transfer contact with downflowing chemical solvent and in the process acid gas is transferred from the feed gas to the chemical solvent to produce clean feed gas and loaded chemical solvent. The cleaned feed gas is withdrawn from the upper portion of absorption column 100 in stream 2 for recovery. In the illustrative example, carbon dioxide dissolves in the potassium carbonate solution during the countercurrent flowing within column 100, forms carbonic acid, which then reacts with the potassium carbonate to form potassium bicarbonate. The extent of conversion of potassium carbonate to potassium bicarbonate is governed by ionic reactions chemical equilibrium. The resulting potassium bicarbonate rich solution is the loaded chemical solvent. This process is exothermic and results in a temperature rise within absorption column 100. The resulting hot potassium bicarbonate rich solution is withdrawn from the lower portion of absorption column 100 in stream 3, reduced in pressure by passage through pressure let down valve 101 and then in stream 4 is passed into the upper portion of regeneration column 102.

Regeneration column 102 is operating at a pressure generally within the range of from 2 to 50 pounds per square inch gauge (psig), preferably within the range of from 5 to 10 psig. As the loaded chemical solvent in stream 4 enters regeneration column 102, a portion flash vaporizes releasing acid gas, e.g. carbon dioxide, and water vapor for flow upward and leaving partially loaded chemical solvent, e.g. potassium bicarbonate rich solution, for flow downward within regeneration column 102 in countercurrent flow with rising vapors as will be more fully described below.

The partially loaded chemical solvent collecting in the sump of column 102 is passed in line 20 to reboiler 6 wherein it is heated by indirect heat exchange with a process fluid such as steam at a pressure less than 150 psig, preferably at a pressure of about 30 psig. The heated partially loaded chemical solvent is then returned to column 102 in stream 21 thereby providing heat to the lower portion of column 102. In the illustrative example, the heating of the potassium bicarbonate solution results in the conversion of the potassium bicarbonate to potassium carbonate and also results in the boiling of some of the liquid water to water vapor for upflow through column 102 as rising vapor.

The heated partially loaded chemical solvent, e.g. potassium carbonate and potassium bicarbonate solution with carbon dioxide dissolved therein, is passed from the lower portion, preferably the sump, of regeneration column 102 in stream 5 into stripping column 107 which typically has from 2 to 10 theoretical equilibrium stages, preferably from 2 to 5 theoretical equilibrium stages. Nitrogen gas is passed in stream 7 into the lower portion of stripping column 107. The nitrogen gas is typically at a temperature within the range of from 70 to 250° F. and at a pressure typically within the range of from 5 to 50 psig, preferably from 10 to 30 psig. The flow rate of nitrogen gas corresponds to 0.5 to 3 pound moles, preferably 1 to 2 pound moles, of nitrogen per pound mole of carbon dioxide in the feed gas. The nitrogen gas may be from an air separation plant such as a cryogenic air separation plant, or an air separation plant employing adsorption or membrane technology. Preferably the nitrogen gas is from a cryogenic air separation plant which also produces oxygen which is employed in another operation of the overall plant, such as for chemical oxidation or combustion purposes.

Within stripping column 107 the downwardly flowing heated partially loaded chemical solvent flows in countercurrent mass transfer contact with upwardly flowing nitrogen gas and in doing so acid gas, e.g. carbon dioxide, is stripped out from the solvent into the nitrogen gas to produce acidified stripping gas in the upper portion of stripping column 107 and regenerated chemical solvent in the lower portion of stripping column 107. The regenerated chemical solvent is withdrawn from the lower portion of stripping column 107 in stream 22 and recovered. In the embodiment of the invention illustrated in FIG. 1, additional chemical solvent, make-up chemical solvent, in stream 11 is combined with all or a portion of stream 22 to form stream 23 which is pumped through pump 105 to form stream 12 which is passed into absorption column 100 for use as previously described. In this way the regenerated chemical solvent produced by the invention finds reuse directly within the system.

The acidified stripping gas, comprising mostly nitrogen and acid gas, is passed from the upper portion of stripping column 107 in stream 24 into the lower portion of regeneration column 102 and then up column 102 as rising vapor in contact with downflowing partially loaded chemical solvent. The rising vapors within column 102 collect in the upper portion of column 102 and are withdrawn therefrom in steam 9 which comprises mostly nitrogen, water vapor and acid gas. Stream 9 is cooled in cooler 25 by indirect heat exchange with a cooling fluid, e.g. cooling water, and at least a portion of the water vapor is condensed. Resulting two phase stream 26 is passed to phase separator 27 wherein it is separated into a vapor portion, which is removed from the system in stream 10, and into a liquid portion which is returned to column 102 in stream 28.

Figure 2:
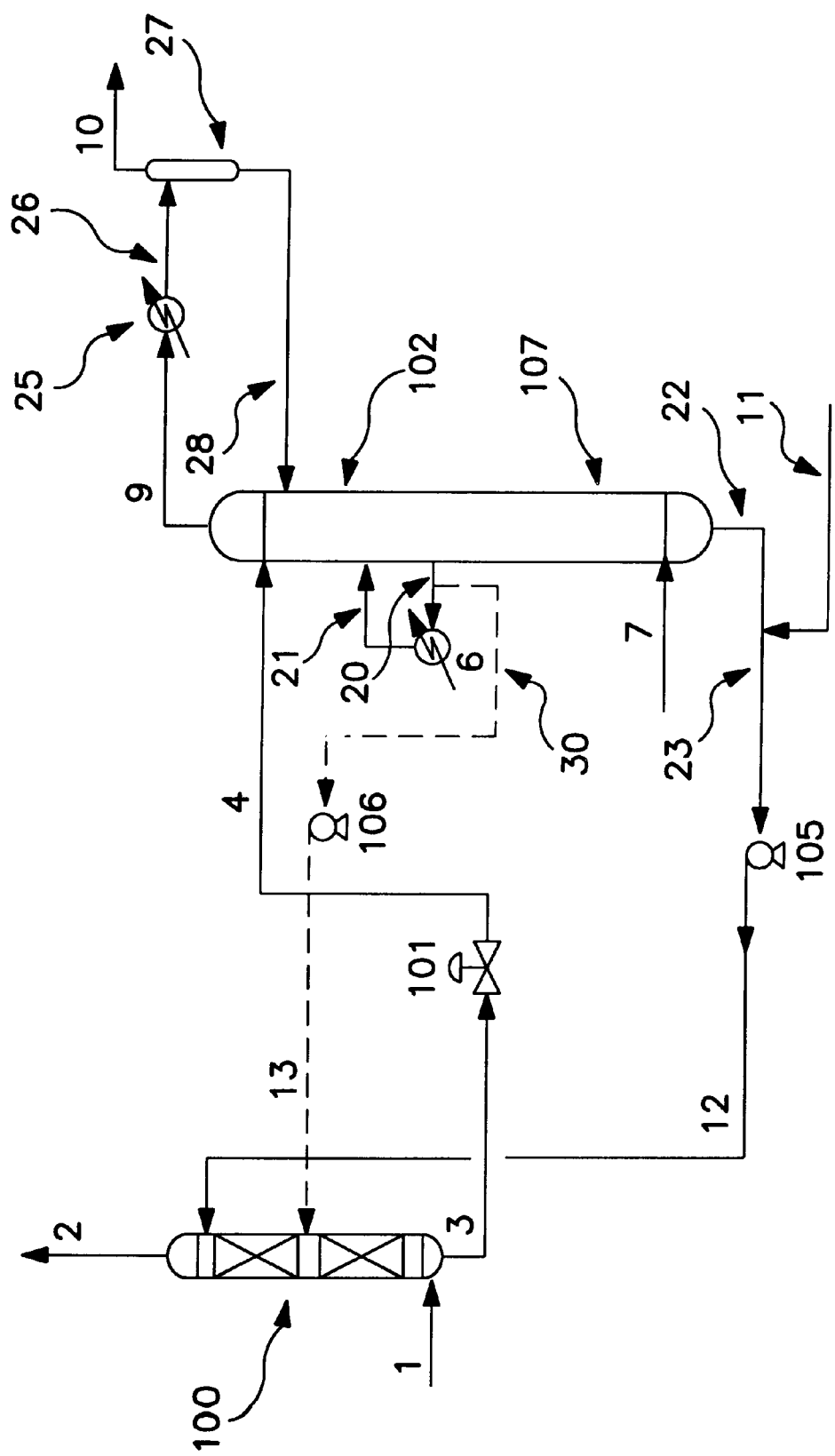
FIG. 2 is a schematic representation of another preferred embodiment of the chemical solvent regeneration system of this invention.

FIG. 2 illustrates another preferred embodiment of the invention wherein the stripping column and the regeneration column are combined and encased in a single piece of hardware. The method of operation of the embodiment illustrated in FIG. 2 is similar to that of the embodiment illustrated in FIG. 1 and will not be described again in detail. The numerals of FIG. 2 are the same as those of FIG. 1 for the common elements.

The embodiment illustrated in FIG. 2 shows one process difference from that illustrated in FIG. 1 in that optionally a portion 30 of partially loaded chemical solvent stream 20 is not passed to reboiler 6 but, rather, is pumped by passage through pump 106 to a higher pressure and then passed as stream 13 at an intermediate level into absorption column 100 for downflow therein, resulting in additional countercurrent mass transfer flow with upflowing acid gas containing feed gas.

Figure 3:
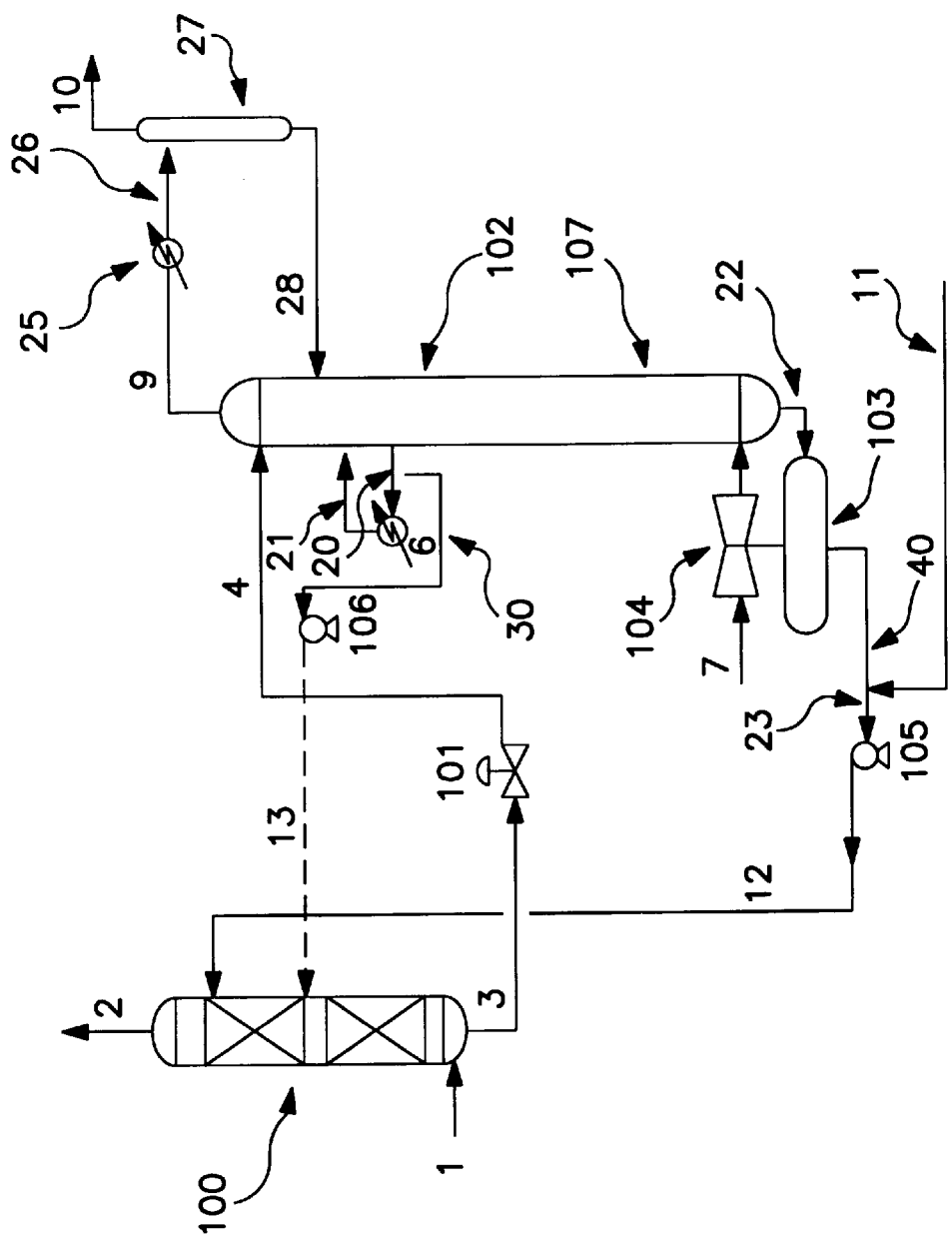
FIG. 3 is a schematic representation of another preferred embodiment of the chemical solvent regeneration system of this invention.

FIG. 3 illustrates another preferred embodiment of the invention wherein nitrogen supplied through line 7 is first used as motive fluid to ejector 104, which is in contact with a flash drum 103. The method of operation of the embodiment illustrated in FIG. 3 to regenerate dirty solvent into clean solvent is similar to that of the embodiments illustrated in FIGS. 1 and 2, and will not be described in detail. The numerals in FIG. 3 are the same as those in FIGS. 1 and 2 for the common elements. The embodiment illustrated in FIG. 3 results in vaporization of a portion of water in the regenerated chemical solvent, and an increase in the flow rate of stripping gas enabling more thorough desorption of acid gas from the downflowing liquid mixture. The solvent in stream 22 first passes to drum 103 and then from drum 103 in stream 40 for combination with stream 11.

Although the invention has been described in detail with reference to certain preferred embodiments, those skilled in the art will recognize that there are other embodiments of the invention within the spirit and the scope of the claims.

What is claimed is:

1. A method for regenerating a chemical solvent comprising:
    (A) contacting feed gas comprising acid gas with chemical solvent, and passing acid gas from the feed gas into the chemical solvent to produce loaded chemical solvent;
    (B) flash vaporizing some of the acid gas from the loaded chemical solvent to produce partially loaded chemical solvent, and heating the partially loaded chemical solvent to produce heated partially loaded chemical solvent;
    (C) passing the heated partially loaded chemical solvent in countercurrent mass transfer contact with nitrogen gas and stripping acid gas from the heated partially loaded chemical solvent into the nitrogen gas to produce acidified stripping gas and regenerated chemical solvent;
    (D) passing acidified stripping gas in contact with the partially loaded chemical solvent; and
    (E) recovering regenerated chemical solvent.

2. The method of claim 1 further comprising contacting recovered regenerated chemical solvent with feed gas comprising acid gas.

3. The method of claim 1 further comprising contacting partially loaded chemical solvent with feed gas comprising acid gas.

4. The method of claim 1 wherein the partially loaded chemical solvent is heated by indirect heat exchange with steam.

5. The method of claim 1 wherein the acid gas comprises carbon dioxide.

6. The method of claim 1 wherein the chemical solvent comprises a solution of potassium carbonate and water.

7. Apparatus for regenerating a chemical solvent comprising:
    (A) an absorption column, means for passing feed gas comprising acid gas into the lower portion of the absorption column, and means for passing chemical solvent into the upper portion of the absorption column;
    (B) a regeneration column, means for passing fluid from the lower portion of the absorption column to the upper portion of the regeneration column, and means for providing heat to the regeneration column;
    (C) a stripping column, means for passing fluid from the lower portion of the regeneration column into the stripping column, and means for providing nitrogen gas into the stripping column;
    (D) means for passing fluid from the upper portion of the stripping column into the regeneration column; and
    (E) means for recovering regenerated chemical solvent from the lower portion of the stripping column.

8. The apparatus of claim 7 further comprising means for passing fluid from the stripping column to the absorption column.

9. The apparatus of claim 7 further comprising means for passing fluid from the regeneration column to the absorption column.

10. The apparatus of claim 7 wherein the stripping column and the regeneration column are housed together in a unitary element.

* * * * *